March 12, 1963
D. L. WINTER
3,080,897
SABER SAW ATTACHMENT FOR RADIAL SAW MACHINE
Filed March 31, 1961
3 Sheets-Sheet 1
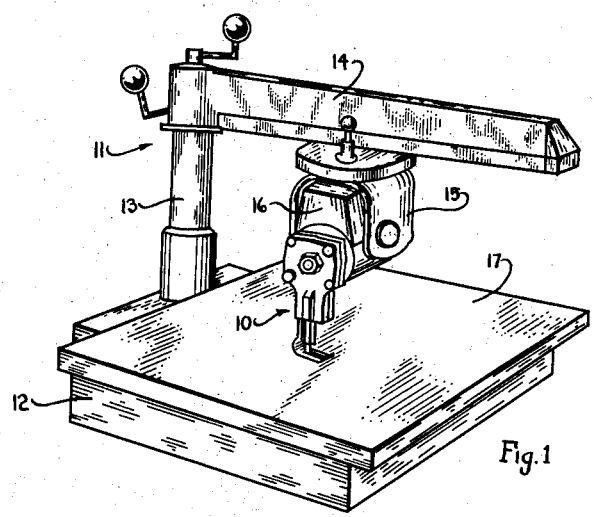
Fig.1
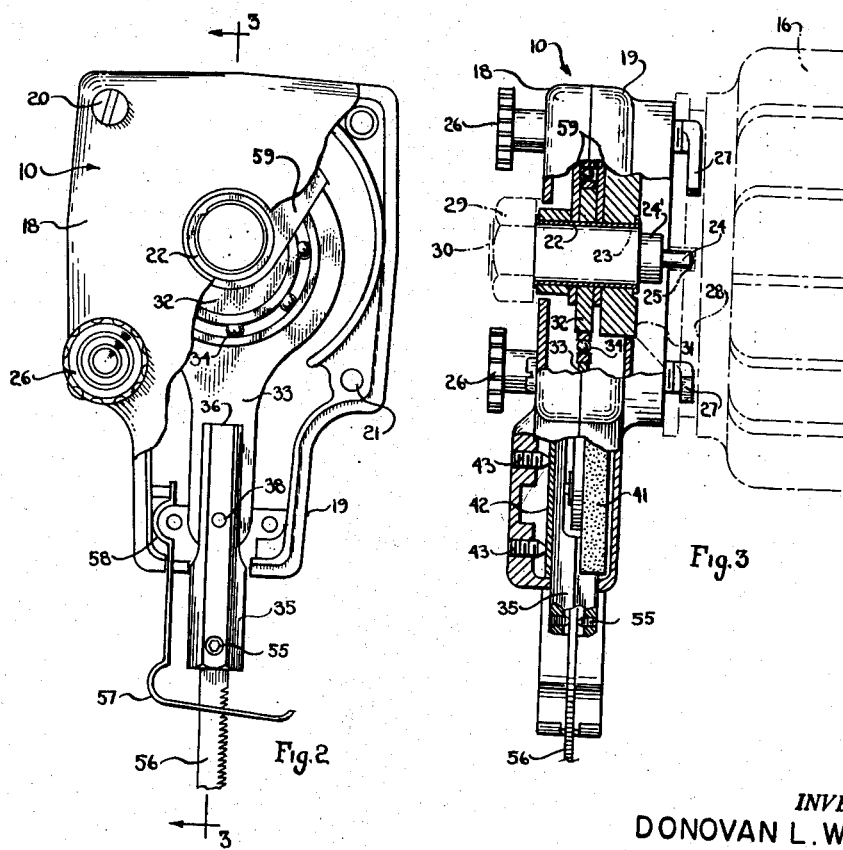
Fig.2
Fig.3
INVENTOR.
DONOVAN L. WINTER
BY March 12, 1963

D. L. WINTER 3,080,897

SABER SAW ATTACHMENT FOR RADIAL SAW MACHINE

Filed March 31, 1961

INVENTOR.
DONOVAN L. WINTER
BY
Leonard Bloom

March 12, 1963 D. L. WINTER 3,080,897
SABER SAW ATTACHMENT FOR RADIAL SAW MACHINE
Filed March 31, 1961 3 Sheets-Sheet 3
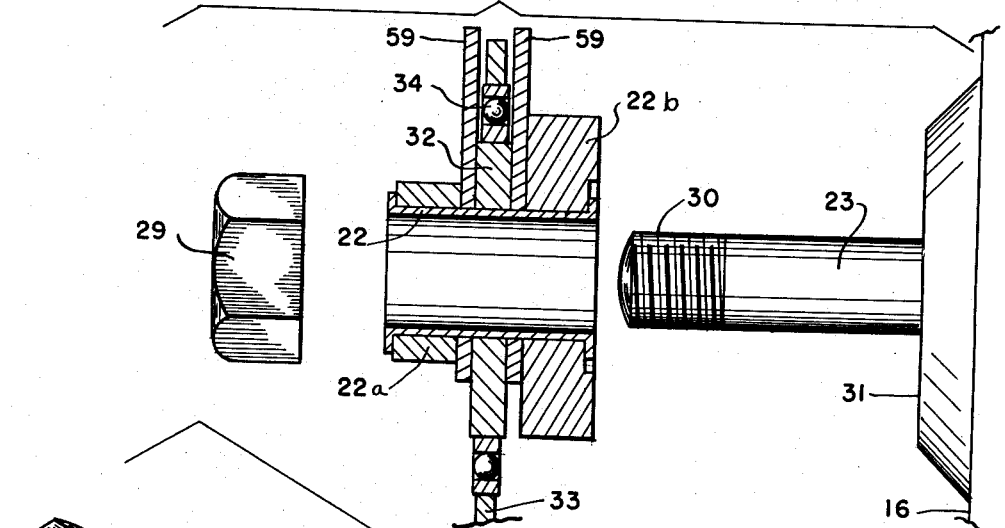
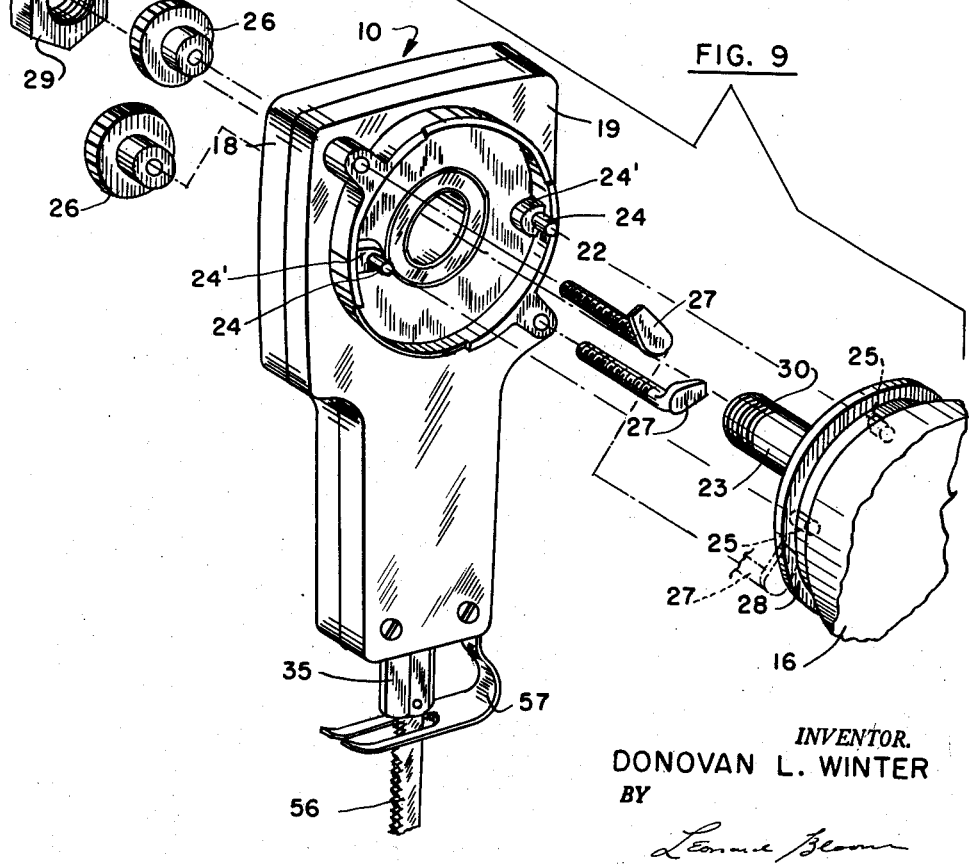
INVENTOR.
DONOVAN L. WINTER
BY
*Leonard Bloom*

United States Patent Office 3,080,897
Patented Mar. 12, 1963

3,080,897
SABER SAW ATTACHMENT FOR RADIAL SAW
MACHINE
Donovan L. Winter, Lancaster, Pa., assignor to Dewalt,
Inc., Lancaster, Pa., a corporation of Delaware
Filed Mar. 31, 1961, Ser. No. 99,847
1 Claim. (Cl. 143—72)

The present invention relates to a saber saw attachment for a radial saw machine or other type of power-driven rotary tool, and more particularly, to such a saber saw attachment that provides a maximum amount of precision and durability at a minimum of cost.

Accordingly, the objects of the present invention are as follows:

First, to provide a saber saw attachment, which includes a housing, and which further includes a spindle having a floating relationship with respect to the housing for the attachment.

Second, to provide a saber saw attachment for a rotary power tool, wherein the floating spindle is coupled to the motor shaft, and wherein the housing for the attachment is detachably secured to the motor housing.

Third, to provide a sabre saw attachment having a reciprocating shuttle journaled in an adjustable bearing.

Fourth, to provide a sabre saw attachment having a split housing formed by a pair of complementary die-cast shells, together with a simple internal construction, the combination thus facilitating rapid and economical assembly of the attachment.

Fifth, to provide a saber saw attachment having a motion-translating mechanism which is resilliently coupled to the reciprocating shuttle.

Sixth, to provide a saber saw attachment having a motion-translating mechanism which includes an eccentric and flat connecting rod having a press-fitted ball bearing therebetween.

Seventh, to provide a saber saw attachment, wherein the reciprocating shuttle is formed from ordinary mill stock having a hexagonal cross section, and wherein the adjustable bearing eliminates any machining of the shuttle by providing a compensation for variations both in the shuttle and in the die-cast shells of the split housing.

Eighth, to provide a saber saw attachment having a hollow spindle through which the motor shaft is slidably and loosely received, the hollow spindle being retained or sandwiched between the arbor nut of the motor and a shoulder on the motor shaft.

Ninth, to provide a saber saw attachment for a rotary power tool, wherein an appreciable variation in the position of the housing for the attachment (with respect to the motor end bell of the rotary power tool) may be accommodated.

Tenth, to provide a saber saw attachment having a split housing which includes a pair of complementary mating halves, comprising an outboard half and an inboard half, the production of the attachment requiring no machining of the inboard half, and only the tapping of two holes on the outboard half of the split housing.

Eleventh, to provide a saber saw having a reciprocating member journaled in an adjustable bearing including a pair of anti-friction shims, one of which is relatively flexible, and the other of which is relatively inflexible and is adjustable with respect to the reciprocating member.

Twelfth, to provide a saber saw attachment including a reciprocating shuttle having a swallow-tailed bifurcated rear portion which straddles a flat connecting rod, the wrist pin means therebetween being located in the approximate axial center of the shuttle.

These and other objects of the present invention will become apparent from the following specification, taken in conjunction with the enclosed drawings, in which:

FIG. 1 is a perspective view of the saber saw attachment of the present invention as mounted upon a conventional radial saw machine;

FIG. 2 is an enlarged elevational view of the saber saw attachment, with part of the outboard housing broken away to show the inner construction;

FIG. 3 is a view taken along the lines 3—3 of FIG. 2, showing the adjustable bearing means for the reciprocating shuttle, and further showing the means for mounting the saber saw attachment to the motor housing and motor shaft;

FIGURE 8 is an exploded view showing, in greater detail, the coupling of the hollow spindle to the motor shaft; and FIGURE 9 is an exploded view, looking into the inboard portion of the attachment housing, and showing in greater detail, the securing of the attachment housing to the motor housing.

Figure 5:
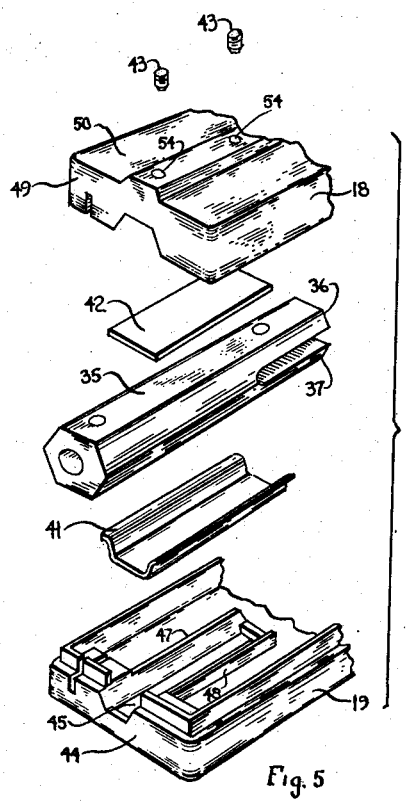
FIG. 5 is an exploded view of a portion of the reciprocating shuttle, adjustable bearing means therefor, and fragmentary portions of the outboard and inboard halves of the split housing for the attachment.

In accordance with a specific embodiment of the present invention, there is provided, for use with a rotary power tool of the type having a motor case and further having a rotating motor shaft, a reciprocating tool attachment including a housing and further including an externally-accessible hollow spindle having a floating relationship with respect to the housing for the attachment, the hollow spindle further having means to slidably and loosely receive the motor shaft therein. Means are provided to detachably secure the housing to the motor case, and means are further provided to couple (or key) the motor shaft to the hollow spindle. The attachment is further provided with an eccentric and connecting rod, which are mounted upon the hollow spindle; and the free end of the connecting rod is received between a bifurcated rear portion of a reciprocating shuttle, the connecting rod being coupled thereto by means of a resilient wrist pin bushing. Adjustable bearing means are further provided to journal the reciprocating shuttle within the housing for the attachment, and the bearing means is facilitated by reason of the attachment having a split housing comprising a pair of complementary mating halves.

With specific reference to FIG. 1, there is illustrated the saber saw attachment 10 of the present invention as mounted upon a conventional radial saw machine 11, the latter having the usual base 12, column 13, radial arm 14, yoke 15, motor 16, and work table 17. It will be appreciated, however, that the teachings of the present invention are equally applicable to any rotor driven power tool, and indeed, to any motor having a rotating shaft.

With reference to FIGS. 2 and 3, the saber saw attachment 10 has a split housing including a pair of complementary mating halves, such as an outboard mating half 18 and an inboard mating half 19. The mating halves 18 and 19 may be die cast from a suitable metal and are held together by means of four self-tapping screws (one of which is indicated at 20) engaging respective recesses 21 located in internal bosses in the other mating half. Two of the screws 20 are located in the upper portion of the attachment 10, being oppositely-disposed from each other; and the remaining two screws 20 are located in the lower portion of the attachment 10, but are not shown herein for ease of illustration.

The attachment 10 is provided with an externally-accessible hollow spindle 22, which is unsupported by the housing, and which has a "floating" relationship with respect to the housing for the attachment; and the attachment 10 is secured to the radial saw machine in the following manner: As shown in FIGURES 3 and 9, the hollow spindle 22 is slid over the motor shaft (or arbor) 23, the motor shaft 23 passing through approximately aligned openings in the attachment housing; and at the same time, a pair of locating dowels carried by the attachment 10 (one of the dowels being shown at 24) are received within corresponding receptacle holes, as at 25, in the housing for motor 16. The dowels 24 are carried by respective bosses, one of which is shown at 24'; and the bosses project from the rear face of inboard mating half 19 and are spaced with respect to each oher, one on each side of motor shaft 23. The dowel engagement is then maintained by a pair of two-piece screw-type clamping members 26 (passing through the attachment 10) and having feet 27 that engage in an annular recess 28 of the housing for motor 16, as shown more particularly in FIG. 3; and it will be appreciated from an examination of FIGS. 1–3, that clamping members 26 are oppositely-disposed from each other and occupy two of the four "corners" of the upper portion of the housing for attachment 10. The motor shaft 23 is loosely received within the hollow spindle 22, there being a loose or sloppy fit therebetween; and inasmuch as the hollow spindle 22 is merely piloted or guided over the motor shaft 23, there is no necessity for accurately controlling the internal diameter of the hollow spindle 22 to very close tolerances. A suitable locking nut 29 (shown in phantom view in FIG. 3) engages a threaded portion 30 of motor shaft 23; and the hollow spindle 22 is retained (or sandwiched) between locking nut 29 and a shoulder 31 on motor shaft 23, thereby coupling or fixing the motor shaft 23 to the hollow spindle 22 for rotation in unison, as shown more clearly in FIGURE 8.

A motion-translating mechanism, including eccentric 32 and connecting rod 33, is mounted upon hollow spindle 22; and preferably, a press-fitted ball bearing 34 is interposed between the eccentric 32 and connecting rod 33, the inner race of the ball bearing 34 being secured to the eccentric 32 and the outer race of the ball bearing 34 being secured to the connecting rod 33 thus allowing the connecting rod 33 to shift angularly (in its plane) and with respect to the hollow spindle 22. As shown in FIGURES 3 and 8, a pair of washers 22a and 22b are mounted upon the hollow spindle 22; and the ends of the hollow spindle 22 are swaged down over the washers 22a and 22b, thus clamping the eccentric 32, the counterweights 59, the washers 22a and 22b, and the inner race of ball bearing 34, together as a unit, for rotation in unison with the rotation of the hollow spindle 22 and the motor shaft 23. The free end of connecting rod 33 is then resiliently coupled to a reciprocating shuttle 35 in a manner hereinafter to be described.

Figure 4:
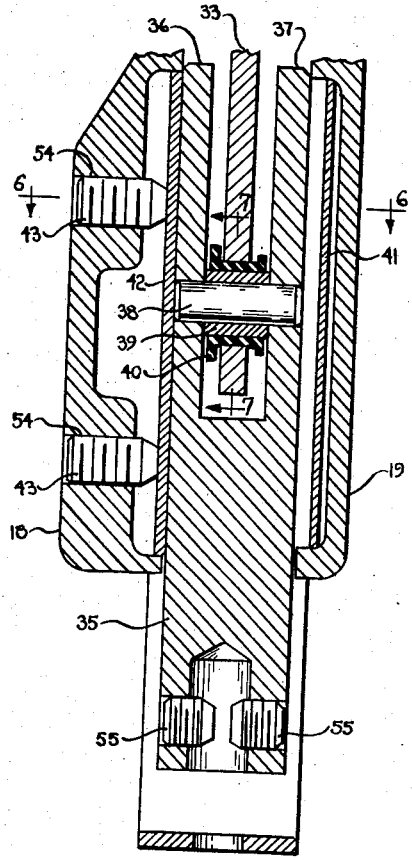
FIG. 4 is an enlarged view of a portion of FIG. 3, showing the adjustable bearing means for the reciprocating shuttle, and also showing the resilient coupling between the motion-translating mechanism and the reciprocating shuttle.
Figure 7:
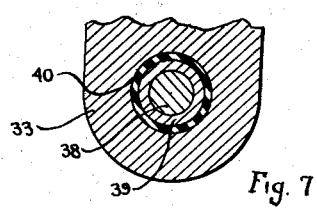
FIG. 7 is a sectional view taken along the lines 7—7 of FIG. 4.

With reference to FIGS. 4, 5, and 7, the reciprocating shuttle 35 is "swallow-tailed," that is to say, it has a bifurcated rear portion including legs 36 and 37; and the flat connecting rod 33 is received between legs 36 and 37 and is resiliently secured thereto by means of wrist pin 38, steel bushing 39, and resilient wrist pin busing 40, the latter being made of a suitable material such as plastic. Thus, a floating eccentric arrangement is provided which allows the hollow spindle 22 of the saber saw attachment 10 to be sandwiched between the locking nut 29 and the shoulder 31 of motor shaft 23 (as previously noted) compatible with an appreciable variation in position relative to the housing for the sabre saw attachment 10, which, it will be recalled, is secured to the housing of the motor 16. Moreover, it will be appreciated that there is no direct physical interconnection between the hollow spindle 22 and the mating halves 18 and 19 of the attachment 10; and hence, virtually no machining of the inboard mating half 19 is required, and only two holes (hereinafter described) need be tapped on the outboard mating half 18.

Such a floating eccentric or "floating hub" feature allows the saber saw attachment 10 to seat properly with regard to both the motor housing 16 and the shoulder 31 of the motor shaft 23, while the resilient wrist pin bushing 40 at the shuttle end of connecting rod 33 allows the hollow spindle (or "floating hub") to position as required without otherwise imparing the normal action of reciprocating shuttle 35. Moreover, the central location of the wrist action in reciprocating shuttle 35 minimizes the movement of connecting rod 33 and reduces the load upon the resilient wrist pin bushing 40 to a level compatible with the capabilities of ordinary plastic material. Also, the "swallow-tailed" bifurcated rear portion of the reciprocating shuttle 35 renders it possible to have extended bearings for the shuttle 35, and at the same time a relatively-long connecting rod 33, without requiring the vertical distance from the axis of the hollow spindle 22 to the bottom of the housing for the saber saw attachment 10 to be increased; and moreover, it is also possible to locate the wrist pin 38 in the vicinity of the center of reciprocation of the shuttle 35. Hence, the net result is that the motion and loads at the wrist action are at a minimum; consequently, the size of the resilient wrist pin bushing 40, wrist pin 38, and bushing 39 are minimized. Furthermore, locating the wrist pin 38 in the vicinity of the center of the reciprocating shuttle 35 contributes considerably towards providing an evenly-distributed load pattern on the surfaces of the adjustable shuttle bearing, hereinafter to be described in detail. This load distribution pattern, in conjunction with the extended length of the adjustable bearing means for the shuttle 35, allows the use of more economical shuttle bearing materials feasible for the lower order of loads that are encountered. Also, the aforesaid floating hub and wrist action is compatible with respect to the adjustable bearing means for the reciprocating shuttle 35, which means will now be described in detail.

Figure 6:
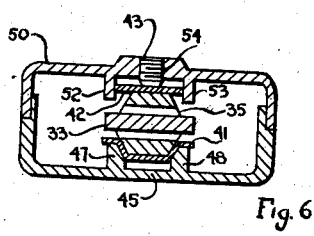
FIG. 6 is a sectional view taken along the lines 6—6 of FIG. 4, the view being turned at right angles for ease of illustration.

With reference to FIGS. 4, 5, and 6, the manually-adjustable bearing means for the reciprocating shuttle 35 includes a pair of anti-friction shims, one of which (41) is relatively-flexible, and the other of which (42) is relatively-inflexible. Shim 41 (as shown more clearly in FIGURES 3 and 5) is provided with a trough and is adapted to embrace a circumferential portion of the reciprocating shuttle 35. The shuttle 35 has a hexagonal cross-section, as shown more clearly in FIGS. 5 and 6, and may be formed from ordinary mill stock with no machining of its faces being required. Shim 42, on the other hand, is flat and is relatively-inflexible, being backed by set screws 43 to bear against one of the flat faces of the hexagonal cross-sectioned reciprocating shuttle 35. Moreover, as shown most clearly in FIGS. 5 and 6, inboard mating half 19 has a lowermost portion 44, which includes a side wall 45 and which further includes an internal longitudinal guide way having a pair of spaced fins 47 and 48; these fins are inclined slightly with respect to each other and diverge outwardly with respect to side wall 45, as shown in FIG. 6. Thus, fins 47 and 48 are complementary to a peripheral portion of the hexagonal cross-sectioned reciprocating shuttle 35; and in the course of assembling the attachment 10, the first shim 41 is adapted to be loosely disposed between fins 47 and 48 and reciprocating shuttle 35, as shown most clearly in FIGS. 3 and 6.

Also, the outboard mating half 18 (of the split housing for attachment 10) has a lower portion 49 (FIGURE 5) having a sidewall 50 parallel to side wall 45 of mating half 19, and mating half 18 further has a pair of internal parallel spaced fins 52 and 53 as shown in FIG. 6. In the assembly of attachment 10, second shim 42, which is flat and relatively-inflexible, is confined intermediate fins 52 and 53 and disposed between a flat face of shuttle 35 and respective side wall 50. Set screws 43 are received in corresponding threaded recesses 54 (tapped in outboard mating half 18) and bear against the face of shim 42 opposite from shuttle 35; set screws 43 may be manually adjusted, and hence, an adjustable bearing means is provided for journaling the reciprocating shuttle 35 within the saber saw attachment 10.

Thus, the adjustable bearing means for the reciprocating shuttle 35 is in the nature of a "V opposed by a flat," that is to say, there is a "three point" bearing relationship between the shuttle 35 and the housing for the attachment; and the flat shim 42 is adjustable transversely of the axis of reciprocation, that is to say, transversely of the axis of the V. By providing the reciprocating shuttle 35 with a hexagon cross-section which is complementary to such adjustable bearing means, a precision fit of the reciprocating shuttle 35 is obtained with respect to the housing for the attachment 10. Moreover, such a precision fit is compatible not only with the standard mill tolerance on hexagonal stock, but also, with the standard manufacturing variations in practice in the die casting of mating halves 18 and 19; and it will be appreciated that any such variations in either component may be compensated for by merely manipulating the set screws 43 of the adjustable bearing means. In such a manner, the shuttle 35 will be confined to a reciprocating movement, and any movement of shuttle 35 transversely thereof is eliminated.

Also, the reciprocating shuttle is further provided with set screws 55 for securing a suitable saw blade 56 thereto (see FIGURES 2 and 3); and a spring foot 57 is provided to hold down the work, the foot 56 being fitted into suitable recesses 58 of the housing. Also, as shown in FIG. 2, suitable counterweights 59 may be mounted on hollow spindle 22 adjacent eccentric 32.

In short, it is seen that the present invention fulfills a need for an inexpensive easily-assembled reciprocating saw attachment for a rotary power-driven tool, such as a radial saw machine, wherein the attachment may be detachably mounted to the rotary tool, quickly and easily, and wherein the attachment provides a maximum degree of inherent precision and durability at a minimum of cost to the consumer.

I claim:

For use with a radial saw machine of the type having a motor housing and further having a motor shaft projecting beyond the motor housing, a sabre saw attachment comprising:

(a) an attachment housing having an opening therein;
(b) a hollow spindle within said attachment housing;
(c) said hollow spindle being externally-accessible through said opening in said attachment housing;
(d) said hollow spindle further being unsupported by said attachment housing, whereby said hollow spindle has a floating relationship with respect to said attachment housing;
(e) means to receive the motor shaft through said opening in said attachment housing and to slide the motor shaft within said hollow spindle and to thereafter lock said hollow spindle to the motor shaft for rotation in unison;
(f) means to detachably secure said attachment housing to the motor housing;
(g) an eccentric mounted upon said hollow spindle for rotation therewith;
(h) means including a connecting rod mounted upon said eccentric;
(i) a reciprocating shuttle journaled in said attachment housing; and
(j) means to couple said connecting rod to said reciprocating shuttle;
(k) said last-named means including a resilient wrist pin bushing between said connecting rod and said shuttle.

References Cited in the file of this patent

UNITED STATES PATENTS

| | | |
|---|---|---|
| 82,501 | Dobson | Sept. 29, 1868 |
| 2,282,728 | Kern | May 12, 1942 |
| 2,619,132 | Pierce | Nov. 25, 1952 |
| 2,631,619 | Folli | Mar. 17, 1953 |
| 2,746,493 | Babcock | May 22, 1956 |
| 2,783,792 | Keesling | Mar. 5, 1957 |
| 2,884,027 | Pulera et al. | Apr. 28, 1959 |
| 2,905,213 | Levine | Sept. 22, 1959 |
| 2,933,111 | Fish | Apr. 19, 1960 |

FOREIGN PATENTS

| | | |
|---|---|---|
| 281,214 | Switzerland | June 3, 1952 |

OTHER REFERENCES

"Machine Design," vol. 22, No. 4, page 17, April 1950.

UNITED STATES PATENT OFFICE
CERTIFICATE OF CORRECTION

Patent No. 3,080,897                                               March 12, 1963

Donovan L. Winter

It is hereby certified that error appears in the above numbered patent requiring correction and that the said Letters Patent should read as corrected below.

Column 1, line 32, for "resilliently" read -- resiliently --; column 3, line 20, for "oher" read -- other --; line 67, for "busing" read -- bushing --.

Signed and sealed this 29th day of October 1963.

(SEAL)
Attest:

ERNEST W. SWIDER                                    EDWIN L. REYNOLDS

Attesting Officer                                         Acting Commissioner of Patents